KEYBOARD CIRCUIT FOR ELECTRONIC COMPUTERS AND THE LIKE

Filed Oct. 25, 1952

2 Sheets-Sheet 1

INVENTOR
DONALD T. FENNESSY
BY William S. Sloover
AGENT

INVENTOR
DONALD T. FENNESSY
BY William L. Glover
AGENT

United States Patent Office 2,718,633
Patented Sept. 20, 1955

2,718,633

KEYBOARD CIRCUIT FOR ELECTRONIC COMPUTERS AND THE LIKE

Donald T. Fennessy, East Orange, N. J., assignor to Monroe Calculating Machine Company, Orange, N. J., a corporation of Delaware Application October 25, 1952, Serial No. 316,916

10 Claims. (Cl. 340—345)

This invention relates to electronic computers and the like and more particularly to a new and improved keyboard circuit for use with the same.

Electronic computers are known wherein the means for entering data into the same comprises a manually manipulatable keyboard circuit. Of these computers, some handle data in one or the other of a variety of pseudo binary systems of notation, for example, the binary coded decimal or 1, 2, 4, 8 system. The invention is chiefly concerned with keyboards adapted to enter data into a computer in accordance with one of the pseudo binary systems of notation, particularly the binary coded decimal system.

Prior keyboard circuits are known which include a large number of electronic tubes for producing electrical signals of appropriate character in synchronism with the timing of an associated computer in response to the operation of a key. Such circuits have generally been satisfactory in operation but are too expensive both in initial cost and in upkeep due to the large number of electronic tubes included therein.

The principal object of the invention, therefore, is the provision of a keyboard circuit of the type described which includes a minimum number of electronic tubes and which is, therefore, less expensive than prior circuits.

The means of the invention, although applicable generally to all types of electrical keyboards, are particularly well adapted to keyboards of the ten key variety. Ten key keyboards have many advantages over other types of keyboards, but for electronic computers or like applications they have a disadvantage generally not found in the other keyboards; namely, ten key keyboards do not provide an operator with any indication of what keys have been operated so that if two or more keys are operated concurrently by accident, erroneous data may be entered into the computer.

Another object of the invention provides means for indicating to an operator whenever two or more keys of the keyboard are operated concurrently.

According to the invention, a keyboard for producing serial pulses representative of decimal digits in a code wherein the representation for each odd decimal digit is the same as that for the next lower even digit plus that for the decimal digit is provided with a series of digital keys, a plurality of cathode followers each associated with an odd-even pair of said keys or the "one" key, a resistor and a diode connected in parallel to the input of each cathode follower, means for applying timing signals to said resistors to effect conduction of the cathode followers, means for applying a negative potential to each said diode to effect conduction thereof and block control of the associated cathode follower by the timing signals, means controlled by each key for cutting off the associated diode, means controlled by the odd valued keys for cutting off the diode associated with the "one" key, and an alarm actuated on concurrent operation of two or more keys.

Other objects and features of the invention will become apparent from the following description when read in the light of the drawings of which:

Figure 1:
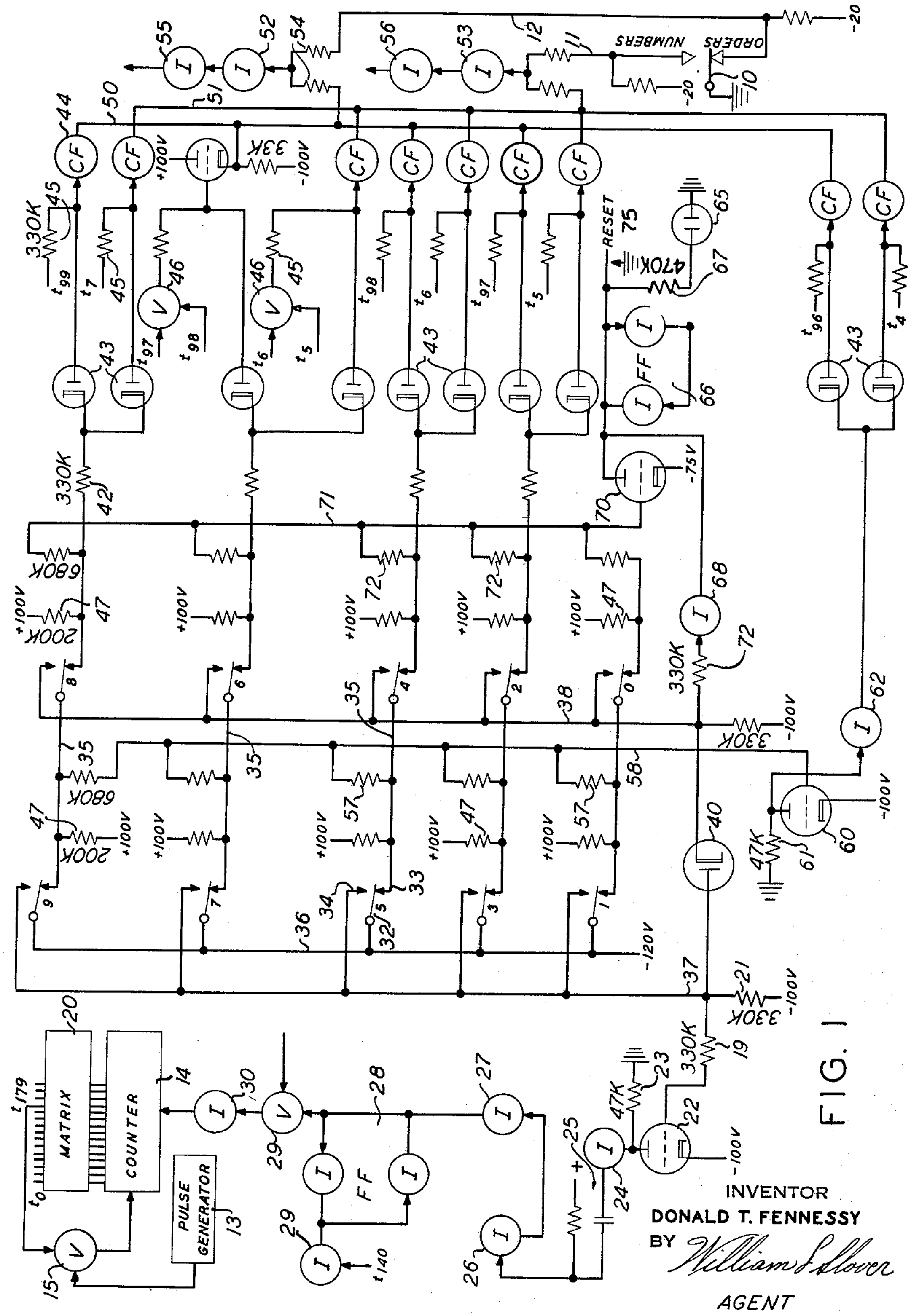
Fig. 1 is a schematic wiring diagram of the means of the invention.

Referring to Fig. 1, the means of the invention is illustrated as embodied in a ten-key keyboard for entering information into a computer, digit by digit, in the form of pulses arranged serially in accordance with the binary coded decimal system of notation. In this system, the ten decimal digits are represented by differential combinations of four pulses having the values 1, 2, 4 and 8 and occurring during four successive time or pulse periods.

The information to be entered into the computer by the keyboard is of two types, namely, numbers to be used in computations, and numbers to be used as instructions or orders for the computer. In order to differentiate between the two types of information, the keyboard includes means for effecting production of the code pulses at either of two times during each computer cycle, for example, during time periods $t_4$, $t_5$, $t_6$ and $t_7$ or time periods $t_{96}$, $t_{97}$, $t_{98}$ and $t_{99}$ of a 180 time period cycle, and a switch operable to determine at which time the pulses are to be produced. The said switch is designated 10 in Fig. 1 and is effective to apply ground potential to either of two conductors 11 and 12 which are otherwise maintained at a negative potential of, say, −20 volts. For convenience of description, it will be considered that when conductor 11 is at ground potential the keyboard is being used to enter digits for use in computations, hereinafter called "numbers," and that when conductor 12 is at ground potential, the keyboard is being used to enter instruction digits, hereinafter called "orders."

Before entering into a detailed description of the keyboard circuit of the invention, it is deemed desirable first to describe the manner in which timing control is exercised thereover by the computer with which it is associated in the illustrated instance of the invention.

Figure 3:
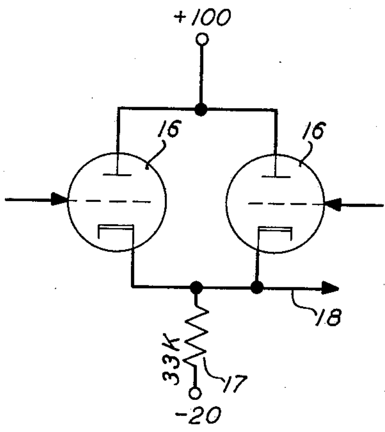
Fig. 3 is another detailed wiring diagram of a circuit component utilized in the means of the invention.

The computer includes a pulse generator 13 adapted to produce negative pulses which may fall 20 volts from a zero volt level and a binary counter 14 advanced step by step by said pulses. For purposes to become apparent hereinafter, the negative pulses are applied to the counter through an "or" gate 15 which, as shown in Fig. 3, may comprise a pair of triodes 16 having their anodes commonly connected to a source of positive potential and their cathodes connected, in common, through a resistor 17, to a source of negative potential, say −20 volts. An output line 18 extends from the connected cathodes of the triodes 16, and, when both triodes are cut off, assumes a potential of approximately −20 volts. However, when either triode is made conducting, the potential of output line 18 rises to approximately 0 volts.

Counter 14 may include eight stages of which each is connected to a diode matrix 20 having a plurality of output lines each appropriate to a predetermined count of counter 14 and maintained at a potential of approximately −20 volts except when the said count is attained, at which time the potential thereof is raised to zero volts.

The time for which counter 14 stands at each count measures a time period, and 180 time periods constitute a computer cycle. In order to halt counter 14 at the one hundred eightieth count, the output of matrix 15 appropriate to that count is applied to "or" gate 15 to maintain the output of the latter at a high potential and thereby to prevent further advance of the counter due to the negative pulses from generator 13. As indicated in the drawing, counter 14 begins counting at an initial count of zero so that it is the time period $t_{179}$ output of matrix 20 that is applied to "or" gate 15.

Figure 2:
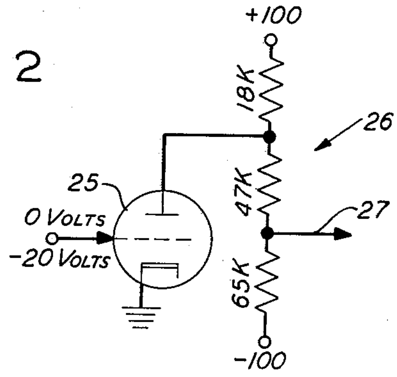
Fig. 2 is a detailed wiring diagram of a circuit component utilized in the means of the invention.

When the keyboard is being used to enter information into the computer, counter 14 is caused to advance through a single cycle of operation each time a digit key is depressed to effect production of a single set of time period signals on the output lines of matrix 20. To this end a triode 22 (Fig. 1) having its cathode connected to a source of negative potential, say —100 volts, and its anode connected through a resistor 23 to ground potential, is normally maintained conducting by the application to its grid, through a pair of resistors 19 and 21, of a —100 volt potential. However, the triode is cut off each time a keyboard key is operated as will be described hereinafter. The anode of triode 22 is applied to the grid of an inverter 24 which, as shown in Fig. 2, may constitute a triode 25 having its cathode grounded and its anode connected to a voltage divider 26 from a center tap of which an output line 27 is extended. The voltage divider is connected across sources of positive and negative 100 volt potential, and using the resistor values indicated in Fig. 2, output line 27 assumes potentials of approximately 0 and —20 volts when the triode is cut off and conducting respectively. Preferably, potentials of 0 and —20 volts are applied to the grid of the triode to effect conduction and cutoff.

Evidently, when triode 22 is conducting, a negative potential is applied to the grid of inverter 24 and the latter is cut off. However, when a key is operated and triode 22 is cut off, ground potential is applied to the grid of inverter 24 and the latter conducts. The output of inverter 24 is applied to a differentiating circuit 25 which, on conduction of the inverter, delivers a single sharp, negatively directed pulse to the grid of an inverter 26 which is momentarily cut off thereby. The output of inverter 26 is applied to the grid of an inverter 27 which serves as a puller for a bi-stable flip-flop 28. Conveniently, said flip-flop may comprise a pair of inverters of the type described above, each having the output line of its voltage divider applied to the grid of the other. Puller 27 is not provided with a voltage divider, but has its anode directly coupled to that of one tube of the flip-flop. When the puller is made conducting under control of inverter 26, it acts through the voltage divider of the associated flip-flop tube to cut off the other tube of the flip-flop which, in turn, effects conduction of the first tube of the flip-flop. The output line of the flip-flop tube voltage divider with which puller 27 is associated, besides being connected to the other tube of the flip-flop, is also applied to an "or" gate 29 whose output is applied to an inverter 30 which is connected to the several stages of counter 14 to advance the same to capacity in one step. Also applied to "or" gate 29 is a synchronizing signal which momentarily assumes a low potential of —20 volts only at those times when the computer is in condition to begin a cycle of operation. Therefore, when a key is operated, flip-flop 28 is immediately set by puller 27 but inverter 30 is not cut off to jump counter 14 to capacity until the synchronizing signal allows the low potential applied to "or" gate 29 by the flip-flop to be reflected at the input of the inverter. Jumping of the counter to capacity lowers the potential of output line $t_{179}$ of matrix 20 and permits pulses from generator 13 to control "or" gate 15 and thereby to effect step by step advance of counter 14 through a complete cycle of operation.

In order to reset flip-flop 28 in time to prevent a second operation of inverter 30 to jump counter 14 to capacity, a second puller 29 which may be identical with puller 27 is connected with the appropriate tube of the flip-flop and has its grid connected to that output of matrix 20 which is at a high potential (0 volts) during time period $t_{140}$. During said time period, therefore, the flip-flop is reset and the counter halts at the end of the cycle as described above.

The means for controlling the operation of counter 14 described briefly above, including the means for producing the synchronizing signals to control gate 29, are described in detail in the copending application of W. Burkhart et al. No. 270,876 wherein the gate 30 and the flip-flop 28 of the present application are designated 67 and 65 respectively.

In the binary-coded-decimal system of notation, the binary digit values 1, 2, 4 and 8 are utilized singly to represent the decimal digits of the same values, and in combination to represent the remaining decimal digits. Evidently, in this arrangement, all that differentiates the representation of each even valued decimal digit from that of the next higher odd digit is the occurrence of the binary digit value 1 in the representation of the latter. In keeping with this, the keys and the keyboard are arranged in groups, as odd or even, and each odd valued key controls the same code forming means as the next lower even valued key and also the binary digit "1" code forming means.

Each key comprises a transfer contact 32 normally engaged with a back contact 33 but operable to engage a front contact 34. The transfer contact 32 of each even valued key is connected by a conductor 35 with the back contact of the associated next higher odd valued key, and through the transfer contact 32 of the latter key and a conductor 36, to a source of negative potential, say —120 volts. Evidently, therefore, the transfer contact 32 of each key normally has a negative potential of substantially —120 volts impressed thereon, and when operated, applies this potential to the associated front contact 34. The front contacts of the odd valued keys are connected through a common conductor 37 with the resistor 19 which is connected to the grid of triode 22 to limit grid current. Operation of an odd valued key, therefore, effects application of a —120 volt potential to the grid of triode 22 to cut off the latter. The front contacts of the even valued keys are connected through a common conductor 38 with the cathode of a diode 40 whose anode is connected to the resistor 19. Obviously, operation of any even valued key effects conduction of the diode and application of substantially a —120 volt potential to the grid of triode 22 to cut off the latter. Preferably, the cathode of diode 40 is connected to a source of —100 volt potential through a resistor 41 to prevent floating thereof when none of the even valued keys are operated.

It is believed evident, therefore, that whenever a key is operated, the triode 22 is cut off and a set of timing signals are generated as described above.

In order for each even valued key 2, 4, 6 and 8 to effect production of the appropriate code pulses, the back contact 33 thereof is connected through a resistor 42 with the cathodes of a pair of diodes 43. The anode of each diode is connected to the grid of a cathode follower 44 which, as shown, may be identical with one of the triodes of the "or" gate illustrated in Fig. 3. One cathode follower of each pair is utilized for "orders" while the other is utilized for "numbers" code forming, and each also has the appropriate timing signal or signals from matrix 20 applied to its grid through a resistor 45. The cathode followers associated with the "6" and "7" keys each must be controlled by two timing signals due to the occurrence of the binary digit valves "2" and "4" in the code for decimal "6" and "7". Accordingly, the appropriate signals are applied in each case to an "or" gate 46 whose output is connected to the resistor 45.

It will readily be seen, therefore, that when the keys are in their normal positions and a −120 volt potential is applied to the cathodes of the diodes through the keys, the diodes remain in the conducting state and the cathode followers remain cut off regardless of which signal potential, that is 0 or −20 volts, is applied to the resistors 45.

In order to effect conduction of the cathode followers 44 selectively and at the appropriate times, the back contact 33 of each key 1—9 is connected with a source of +100 volts potential through a resistor 47. This connection has no effect on the circuit when the keys are in their normal positions, but when a key is operated, a positive potential is applied to the cathodes of the associated diodes 43 and the latter are cut off. Cutting off of the diodes releases control of the connected cathode followers to the timing signals from matrix 20 which are applied thereto through the resistors 45. Therefore, when timing signals of zero volt potential are applied to the cathode followers associated with an operated key, the same conduct and the output lines thereof assume potentials of approximately zero volts for the duration of said signals. It is to be noted that both cathode followers associated with a key are caused to conduct on operation of the latter, the one at times appropriate to "numbers" entries and the other at times appropriate to "orders" entries.

The cathode followers 44 control the production of code signals representative of the values of operated keys and although both of the pair associated with each key 1—9 are caused to conduct in response to an operation of the latter, it is desired that the same be effective alternatively depending on whether the keyboard is being used to enter "numbers" or "orders." Therefore, the "orders" cathode follower 44 of each pair has its output applied to a common conductor 50 while the output of each "numbers" cathode follower is applied to a common conductor 51. Conductor 50 is connected to one input terminal of a coincidence gate 52 having the conductor 12 described above applied to a second input terminal thereof, and the conductor 51 is connected to a coincidence gate 53 to which the conductor 11 described above is also applied. Each gate 52 and 53 may constitute an inverter of the sort indicated in Fig. 2 but having parallelled, equi-valued resistors 54 connected to the grid thereof. Input signals of approximately 0 or −20 volts are applied to the resistors 54 to control conduction in the tube. When both input signals are of −20 volts, approximately that same potential is applied to the grid of the tube and when one signal is of −20 volts and the other is of 0 volts, a potential of approximately −10 volts is applied to the grid of the tube. Under both of these conditions the tube is cut off. Only when signals of 0 volt potential are applied to both resistors and the potential of the grid is raised to approximately zero volts does the tube conduct. Preferably, the outputs of the gate are the same as those of the inverter of Fig. 2, namely zero and −20 volts.

Therefore, although at each key operation, the associated cathode followers 44 apply timed signals of approximately zero volt potential to both gates 52 and 53 only one of the latter is affected thereby, namely, that to which a second zero volt potential is applied over conductor 11 or 12 under control of switch 10. For example, if a "6" key is operated, zero volt signals are applied to gate 53 during time periods $t_5$ and $t_6$ and to gate 52 during time periods $t_{97}$ and $t_{98}$. If switch 10 is set for "numbers" operation a second zero volt potential is applied to gate 53 and the latter conducts during time periods $t_5$ and $t_6$, but a low potential of −20 volts is applied to gate 52 and the latter does not conduct during time periods $t_{97}$ and $t_{98}$. Of course, if the switch 10 were set for "orders" operation, gate 53 would conduct during time periods $t_{97}$ and $t_{98}$ but gate 52 would not conduct during time periods $t_5$ and $t_6$.

Figure 4:
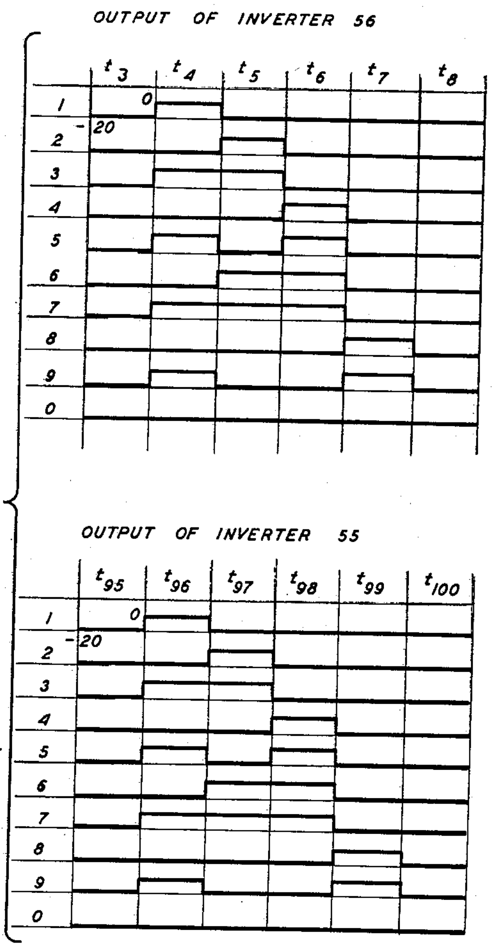
Fig. 4 is a pulse chart indicating the code output of the keyboard of the invention.

The outputs of the gates 52 and 53 constitute the code signals representative of the values of operated keys, but preferably the said outputs are applied to inverters 55 and 56, respectively, to have a high potential of zero volts indicate the presence of a binary digit value "1," "2," "4" or "8" in each decimal digit representation, and a low potential of −20 volts indicate the absence of a binary digit value in each representation as illustrated in Fig. 4.

As mentioned above, operation of an odd key "3," "5," "7" or "9" controls not only the code forming means associated with the next lower even valued key but also the code forming means associated with the "1" key. To this end, the connections between the "1" key and the diodes 43 associated therewith are somewhat different from those of the other keys. The back contact of the "1" key and the other odd valued keys are each connected through a resistor 57 with a common conductor 58 which is connected to the grid of a triode 60. The anode of triode 60 is connected through a resistor 61 with a source of ground potential and the cathode is connected to a source of negative potential, say −100 volts. An inverter 62 has its grid connected to the anode of triode 60 and its output applied to the cathodes of the diodes 43 associated with the "1" key.

When all of the odd valued keys are in their normal positions a potential of −120 volts is impressed on the grid of triode 60 through the transfer contacts of the keys and the resistors 57, and the triode is cut off. This, of course, causes ground potential to be impressed on the grid of inverter 62 which conducts and impresses a potential of −20 volts on the cathodes of the associated diodes 43. Conduction of the diodes blocks control of of the connected cathode followers by the timing signals the same as described above. However, when one of the odd valued keys is operated, the +100 volt source connected to the resistor 47 associated with the key, is effective to raise the potential level of conductor 58 sufficiently to effect conduction of triode 60 which impresses a negative potential on the grid of inverter 62 to cut off the latter. This, of course, applies a high potential of zero volts to the cathodes of the associated diodes 43 which release control of the connected cathode followers to the timing signals applied thereto, the same as described above.

Therefore, whenever an odd valued key is operated the code forming means for the "1" key is actuated along with the code forming means for the next lower, even valued key.

At this point, it is deemed worthwhile to point out that the values of the resistors 45 and 57 are chosen not only to provide the appropriate voltage distribution, but also to limit grid current in triode 60 and to prevent loading of the potential sources. In like manner the values of the resistors 21, 42 and 45 are also chosen to prevent loading.

It will be noted that the zero key has no code forming means associated therewith. This is due to the fact that the absence of code pulses on the output lines of the computer during an entry operation represents a zero. The zero key does, however, initiate a cycle of operation of counter 14 in the same manner as the other keys and thus effects entry of a zero into the computer. The manner of such entry into the computer is, of course, a matter of choice in so far as the invention is concerned, but, for example, may be as disclosed in the copending application of William Burkhart et al. No. 270,876 wherein the digits already entered into the computer are, in effect, shifted one denomination order to the left each time the time period counter undertakes a cycle of operation, and the newly entered digit is entered into the order vacated by the least significant of the shifted digits.

In order to warn an operator of the keyboard whenever two or more keys are operated concurrently by accident, an alarm which may comprise a neon lamp 65 is provided. Lamp 65 is connected between a source of ground potential and the output of a flip-flop 66 which is set to effect illumination of the lamp whenever two or more keys are operated concurrently. Preferably, a resistor 67 is included in the connection between the lamp and the flip-flop to limit current in lamp 65 and prevent loading of the flip-flop. Two pullers 68 and 70 are provided to set the flip-flop, the former being of the same sort as puller 27 described above and the latter constituting a triode having its cathode connected to a source of approximately −75 volts potential. The grid of puller triode 70 is connected through a common conductor 71 and individual resistors 72 to the back contacts 33 of even valued keys and the zero key. When no keys are operated, conductor 71 is connected with the −120 volt source through the series connected transfer contacts of each even valued key (including the zero key) and the associated odd valued key, and impresses this potential on the grid of triode 70 to maintain the same cut off. When any one key is operated, the +100 volt source connected to the resistor 47 associated with the key is effective to raise the potential level of conductor 71 to approximately −90 volts which is insufficient to effect conduction of triode 70. However, when two keys, other than a pair of related odd-even valued keys, are operated concurrently, the +100 volt source, acting through the resistors 47 associated with both keys, is effective to raise the potential of conductor 71 to approximately −70 volts which is sufficient to effect conduction of the triode 70. Conduction of the triode, of course, sets flip-flop 66 and lamp 65 is illuminated. Evidently, concurrent operation of more than two keys also effects conduction of triode 70 and setting of flip-flop 66.

In order to set flip-flop 66 and illuminate lamp 65 when an odd valued key and the related even valued key or zero key are operated concurrently, the grid of puller 68 is connected to the conductor 38 through a resistor 72. Conductor 38 is normally maintained at a potential of −100 volts as described above and maintains puller 68 cut off. Operation of an odd valued key does not disturb the potential level of conductor 38 and operation of an even valued key or the zero key serves only to lower the potential of said conductor to approximately −120 volts. However, if an odd valued key and the related even valued key or zero key are operated concurrently, the +100 volt source acting through the resistor 47 associated with the operated odd valued key is effective to raise the potential of conductor 38 to approximately zero volts and puller 68 conducts to set flip-flop 66 and illuminate lamp 65.

It is evident, therefore, that whenever two or more keys are operated concurrently, the flip-flop 66 is set and lamp 65 is illuminated to warn the operator of the keyboard.

In order to reset flip-flop 66 to extinguish lamp 65 a key 75 is provided to apply ground potential to the grid of the flip-flop tube cutoff as the result of an operation of puller 68 or puller 70, to effect conduction of said tube.

It is to be mentioned that if desired the same timing signals may be applied to all of the cathode followers 44 and the common output lines 50 and 51 thereof may be replaced each by a selection circuit and four output lines. In this arrangement the code pulses would appear simultaneously on the four lines.

It is also to be mentioned that, if desired, the cathode followers 44 may be replaced by inverter tubes or the like.

While there has been above described but a single embodiment of the invention, it is to be understood that many changes or modifications can be made therein without departing from the spirit of the invention and it is not desired, therefore, to limit the scope of the invention except as pointed out in the appended claims or dictated by the prior art.

I claim:

1. In a keyboard for producing serial pulses representative of decimal digits in a code wherein the representation for each odd decimal digit is the same as that for the next lower even digit plus that for the decimal digit one, the combination of a series of digital keys, a plurality of cathode followers of which one is associated with the "one" key and the remainder are associated each with an odd-even pair of said keys, a resistor and a diode connected in parallel to the input of each cathode follower, the diode being normally conductive to block control of the associated cathode follower, the associated resistor and the cathode followers and associated diodes and keys being connected in series, means for applying timing signals to said resistors to effect conduction of the cathode followers, means controlled by each key for cutting off the associated diode, and means controlled by the odd valued keys for cutting off the diode associated with the "one" key.

2. The combination according to claim 1 and including a duplication of each cathode follower, diode and resistor combination, a pair of output lines to each of which one cathode follower of each pair is connected, a pair of coincidence gates each controlled in part by a said line, and a switch controlling said gates for alternative operation.

3. The combination according to claim 1 and including an alarm circuit connected with said digital keys and actuated on concurrent operation of two or more keys.

4. In a keyboard for producing serial pulses representative of decimal digits in a code wherein the representation for each odd decimal digit is the same as that for the next lower even digit plus that for the decimal digit one, the combination of a series of digital keys, a plurality of vacuum tubes of which one is associated with the "one" key and the remainder are associated each with an odd-even pair of said keys, a resistor and a diode connected in parallel to the input of each vacuum tube, the diode being normally conductive to block control of the associated vacuum tube through the associated resistor, and the cathode followers and associated diodes and keys being connected in series, means for applying timing signals to said resistors to effect conduction of the vacuum tubes, means controlled by each key for cutting off the associated diode, and means controlled by the odd valued keys for cutting off the diode associated with the "one" key.

5. The combination according to claim 4 and including a duplication of each vacuum tube, diode and resistor combination, a pair of output lines to each of which one vacuum tube of each pair is connected, a pair of coincidence gates each controlled in part by a said line, and a switch controlling said gates for alternative operation.

6. In a keyboard for producing serial pulses representative of decimal digits in a code wherein the representation for each odd decimal digit is the same as that for the next lower even digit plus that for the decimal digit "one," the combination of a series of digital keys each comprising a transfer contact and front and back contacts, the transfer contact of each odd valued key being connected to the back contact of the next lower even valued key, a diode connected to the back contact of each even valued key, a plurality of cathode followers each having its input connected to a said diode, a resistor connected to the input of each cathode follower in parallel with the diode, means for applying timing signals to said resistors to effect conduction of the cathode followers, sources of negative and positive potential connectable alternatively by each key with the associated diode to effect conduction and cutoff thereof, a cathode follower associated with the "one" key, a diode and a resistor connected in parallel to the input of the last said cathode follower, said signaling means also applying timing signals to the last said resistor, and circuit means connecting the back contact of each odd valued key with the last said diode to effect control of the latter by said potential sources.

7. The combination according to claim 6 and including a duplication of each cathode follower, diode and resistor combination, a pair of output lines to each of which one cathode follower of each pair is connected, a pair of coincidence gates each controlled in part by a said line, and a switch controlling said gates for alternative operation.

8. The combination according to claim 6 and including an alarm circuit connected with said digital keys and actuated on concurrent operation of two or more keys.

9. The combination according to claim 8 wherein said alarm includes an indicator, a flip-flop set to actuate said indicator, a pair of pullers for setting said flip-flop, circuit means for actuating one said puller on concurrent operation of both keys of an odd-even pair, and circuit means for actuating the other puller on concurrent operation of two or more keys not odd-even pairs.

10. In a keyboard for producing serial pulses representative of decimal digits in a code wherein the representation for each of a first group of decimal digits is the same as that for another digit of a second group plus that for another digit, the combination of a series of digital keys, a plurality of cathode followers of which one is associated with the key for said other digit and the remainder are associated each with a first group-second group pair of said keys, a resistor and a diode connected in parallel to the input of each cathode follower, the diode being normally in one state of conduction and blocking control of the cathode follower through the associated resistor and the cathode followers and associated diodes and keys being connected in series, means for applying timing signals to said resistors to effect a change in the state of conduction of the cathode followers, means controlled by each key for changing the state of conduction of the associated diode, and means controlled by the keys of the first group for cutting off the diode associated with the key for said other digit.

References Cited in the file of this patent

UNITED STATES PATENTS

| | | |
|---|---|---|
| 2,570,716 | Rochester | Oct. 9, 1951 |
| 2,641,753 | Oliwa | June 9, 1953 |